United States Patent [19]
Stauffer

[11] Patent Number: 5,924,515
[45] Date of Patent: Jul. 20, 1999

[54] OPERATOR SEAT SLIDING CONTROL CONSOLE

[75] Inventor: David B. Stauffer, New Holland, Pa.

[73] Assignee: New Holland North America, Inc., New Holland, Pa.

[21] Appl. No.: 08/820,469

[22] Filed: Mar. 17, 1997

[51] Int. Cl.$^6$ .............................. B60K 26/00; B62D 1/02
[52] U.S. Cl. ........................................... 180/326; 180/334
[58] Field of Search ................................... 180/326, 329, 180/331, 334

[56] References Cited

U.S. PATENT DOCUMENTS

| | | | |
|---|---|---|---|
| 4,055,230 | 10/1977 | Kestian et al. | 180/89.1 |
| 4,478,308 | 10/1984 | Klaassen | 180/326 |
| 4,646,869 | 3/1987 | Kerner, Jr. | 180/334 |
| 4,702,520 | 10/1987 | Whisler et al. | 297/417 |
| 5,409,080 | 4/1995 | Templeton et al. | 180/326 |
| 5,566,778 | 10/1996 | Valier et al. | 180/334 |
| 5,617,929 | 4/1997 | Richardson et al. | 180/334 |

*Primary Examiner*—Kenneth R. Rice
*Attorney, Agent, or Firm*—J. William Stader; Larry W. Miller; Frank A. Seemar

[57] ABSTRACT

The disclosure relates to an operator seat sliding control console located in the cab of a combine harvester. The console contains a variety of controls and is attached to the chair and may be adjusted forward or rearward, up or down so as to suit a variety of operators or to decrease fatigue. The invention consists of a support plate attached to the chair assembly. Attached to the support plate is an inclined plate with angled inclined length. The console is slideably attached to the inclined length by a series of parallel tracks. The movement between the console and inclined length is controlled by a release mechanism. The operator moves a handle which permits the tracks to slide relative to each other. This permits the console to be placed in a comfortable position. Maintenance of the controls can be accomplished by opening the control surface by means of a console hinge. The console may also be removed by unplugging the wire harness from the harness plug and by removing four bolts in the inclined plate.

17 Claims, 7 Drawing Sheets

OPERATOR SEAT SLIDING CONTROL CONSOLE

BACKGROUND OF INVENTION

1. Field of Art

This invention relates to the improvement of the control console in the cab of an agricultural combine harvester. More specifically it relates to a sliding control console attached to the operator's seat.

2. Description of Prior Art

Mechanical harvesting of grain has taken place for decades. However, efforts continue in the attempt to make harvesting operations more efficient and effective. A combine harvester generally includes a head which cuts the crop. The head then moves the cut crop into a feeder house. The feeder house lifts the cut crop into the threshing and separation areas of the combine. The grain is separated from the stalk by a rotor. The grain is then moved and stored in a grain tank. The chaff and trash are deposited from the rear of the combine. An operator usually runs these various operations from a glass-enclosed cab. Typically, a cab is located behind the head and in front of the threshing and separation areas of the combine. An operator can observe most of the combine activities from the cab. During harvesting periods it is not uncommon for the combine to be operated for an extended time. Sometimes a single operator will use a combine for 16 to 18 hours a day. Furthermore, several operators may alternate in the use of the combine. Therefore is it necessary to provide a cab which will allow maximum operator comfort and flexibility. This will permit the operator to remain mentally alert for the long time intervals needed to harvest crops. One aspect of maintaining the operator's alertness is to provide a control console that may be manipulated to a comfortable position. Equally important is to provide a control console which is located in a manner to allow an unobstructed view of the various combine operations. It would also be advantageous to provide a control console which would be suitable to different sized individuals. Finally it would be desirable to provide a control console that is easy to access for maintenance on the various control systems.

The effort to design and manufacture an acceptable control console for farm operations is considerable. The research effort has followed several paths. Because of the increasing number of control systems on a combine, the control console has grown in size, weight and complexity. The weight of the control console has typically forced the console to be mounted directly to the cab floor. From an ergonomic standpoint, this required a lot of movement on the operator's part. Also, depending on the location of the console, the operator's view of the farming operation could be restricted. Some effort to move the controls to an area near an arm rest has been undertaken. However, the quantity of controls on the console has resulted in several uncomfortable designs from an operator's standpoint. Important considerations in the design of a control console located at the side of the operator include such factors as operator view, the distance between the elbow height and hip pivot point and the distance between the elbow and fingertip. A design which would consider a range of operators from very large builds (so-called 95th percentile person) to very small builds (so-called 5th percentile person) would greatly improve the ease of use of a control console.

The prior art illustrates these and additional difficulties. U.S. Pat. No. 4,055,230 discloses a vehicle control armrest in a vibration isolated control module. The armrest has a single pivot point and cannot be adjusted to reflect a different sized operator. Specifically, the distance from the operator's elbow to the control handle remains fixed. If a smaller or larger operator desired to use control stick 72, the distance from the natural bend of their elbow to the control stick 72 could not be easily adjusted. Furthermore, the general position of the operator's arm would have to remain relatively constant. Over a long period of time, such as during harvesting operations, this one position could become very uncomfortable. Furthermore, the weight of the console necessitates that the console be attached to the cab floor. Finally, maintenance access to the console is complex.

U.S. Pat. No. 4,478,308 discloses an industrial vehicle having an adjustable and pivotal armrest. Similar to the above prior art, this device has a single pivot point which does not allow an adjustment to suit a variety of different sized individuals. Again the weight of the control console requires it be affixed to the cab floor and maintenance access is difficult U.S. Pat. No. 4,646,869 discloses an adjustable control console. Here the control console is imbedded into the chair and arm rest. An assembly illustrated in FIG. 3 allows the console to be pivoted about 24. However, this again does not allow an adjustment to suit a variety of individuals. Finally, maintenance on such an assembly may be a difficult task.

U.S. Pat. No. 4,702,520 discloses an adjustable armrest with integral vehicle controls. This invention discloses a pivoting section containing the control equipment and an adjustable armrest. This device provides better support, but requires two separate adjusting mechanisms 87 and 47 to comfortably adjust the armrest. Furthermore, because of the single pivot point, the amount of weight which can be placed on the armrest is limited. This, in turn, limits the number of controls which can be placed on the armrest. Finally, access for maintenance is limited.

U.S. Pat. No. 5,409,080 discloses a shiftable control console for tractors. This console is attached directly to the floor. This results in a number of controls being placed on the console. However, if the operator adjusts the seat, then a corresponding adjustment must be made to the position of the console. Further, an armrest is provided as an attachment to the seat.

U.S. Pat. No. 5,566,778 discloses a control assembly for operating an agricultural tractor. Again, this invention has a single pivot about item 14. The armrest can slide. However, because the assembly must be supported by a single pivot point, the weight (and consequently the number of controls) is limited. Further, the distance between the operator's hip and elbow are fixed. It would be desirable to be able to alter this distance for a variety of operator sizes or during a long work day.

Consequently, the need exists for an operator seat sliding control console which will provide an unobstructed view of farming operations, will be easy to maintain and is adjustable for a wide range of individuals.

OBJECTS OF THE INVENTION

It is an object of the present invention to provide an operator seat sliding console which is supported by the operator's chair.

It is a further object of the present invention to provide an operator seat sliding console which is attached to a support plate having a series of channels for strengthening the support plate.

It is a further object of the present invention to provide an operator seat sliding console which moves on several tracks on an inclined plate.

It is a further object of the present invention to provide an operator seat sliding console whose movement is controlled by a single release mechanism.

It is a further object of the present invention to provide an operator seat sliding console which can accommodate a small individual and a large individual.

It is a further object of the present invention to provide an operator seat sliding console which can be adjusted to a variety of positions to reduce operator fatigue.

It is a further object of the present invention to provide an operator seat sliding console which accommodates a variety of controls without obstructing the operator's view.

It is a further object of the present invention to provide an operator seat sliding console which can be easily accessed for maintenance of the controls.

It is a further object of the present invention to provide an operator seat sliding console which can be easily removed for repair.

It is a further object of the present invention to provide an operator seat sliding console for which the wiring harness can be moved without damaging the electrical connections to the controls.

SUMMARY OF THE INVENTION

The invention overcomes the deficiencies of the prior art. The invention is an operator seat sliding console. The console containing a variety of controls can be shifted to accommodate a range of individuals. The invention consists of a support plate attached to the chair support assembly. Attached to the support plate is an inclined plate. The inclined plate has an inclined length approximately 6 inches long. The longitudinal angle of the inclined length is 10 degrees. Connecting the console to the inclined length are several parallel tracks. Each track consists of a plate track which is attached to the inclined length and a console track which is attached to the console. A release mechanism allows the operator to move the console generally forward or rearward and up or down on the inclined plate. The console may be easily accessed for maintenance or repairs by means of a console hinge. The console can also be removed by unplugging the wire harness from a harness plug and by removing four bolts in the inclined plate.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
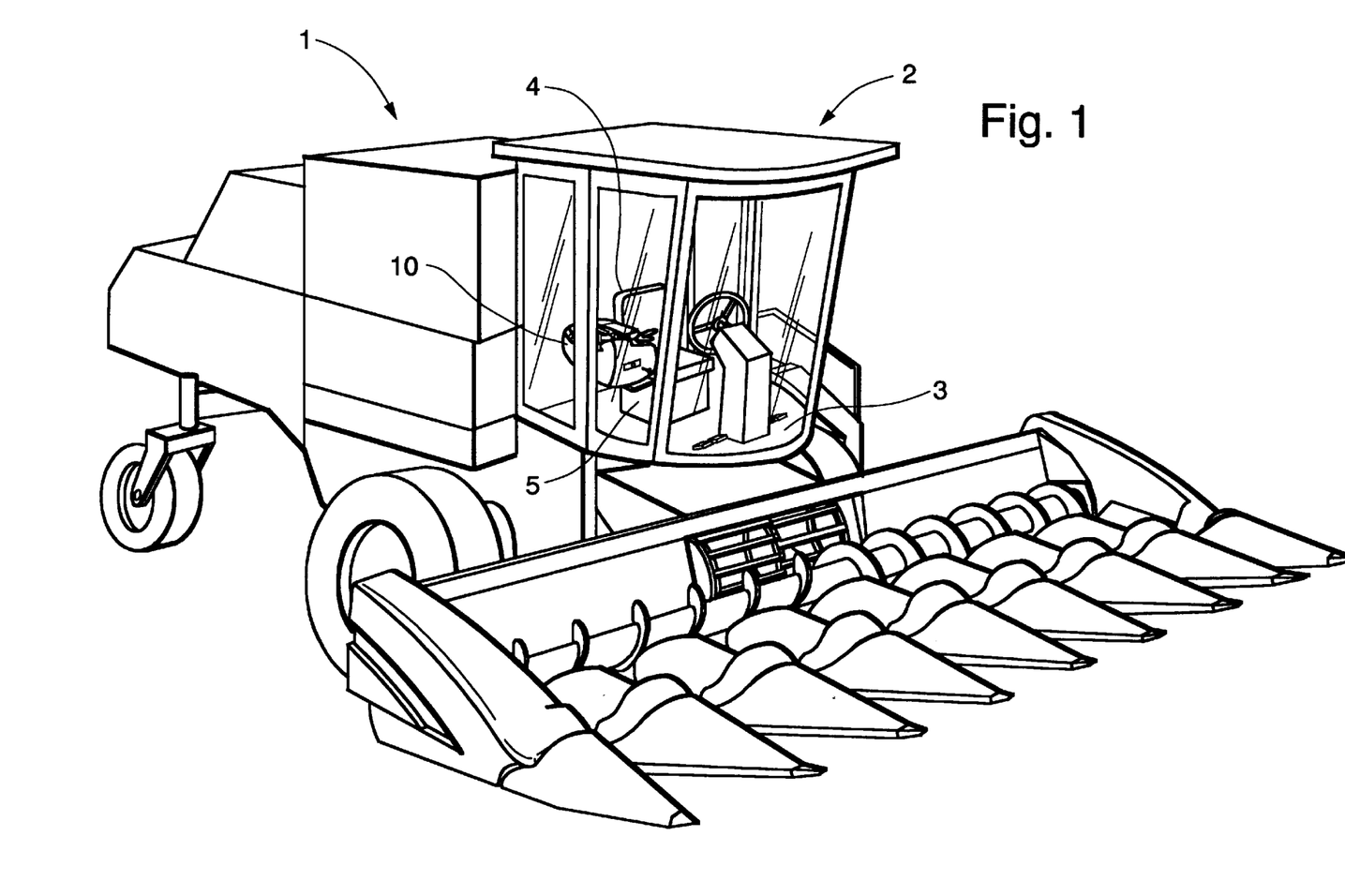
FIG. 1 is a general view of a combine harvester combine with a containing the present invention.
Figure 2:
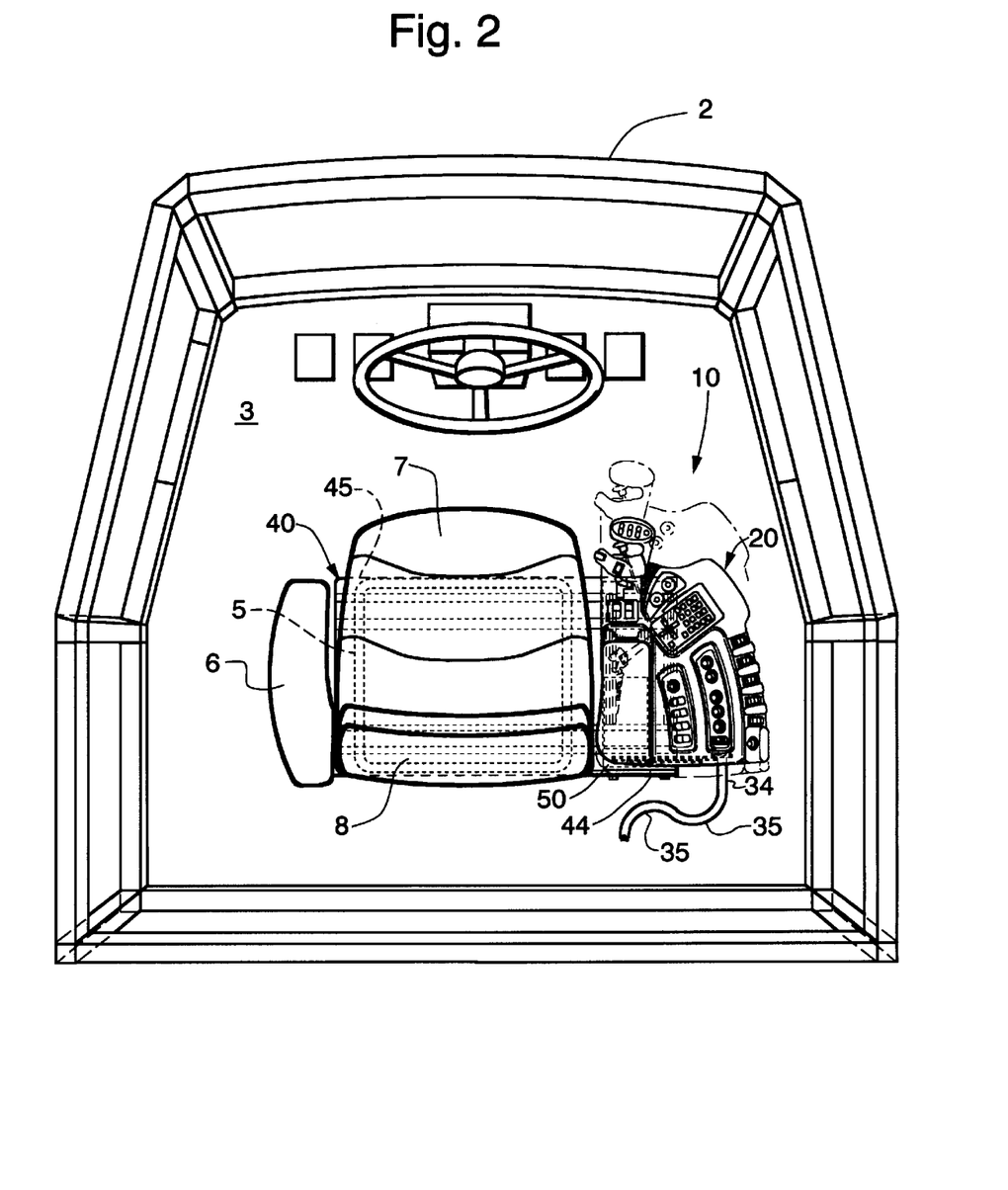
FIG. 2 is an overhead view of the interior of a cab of a combine harvester containing the present invention.
Figure 3:
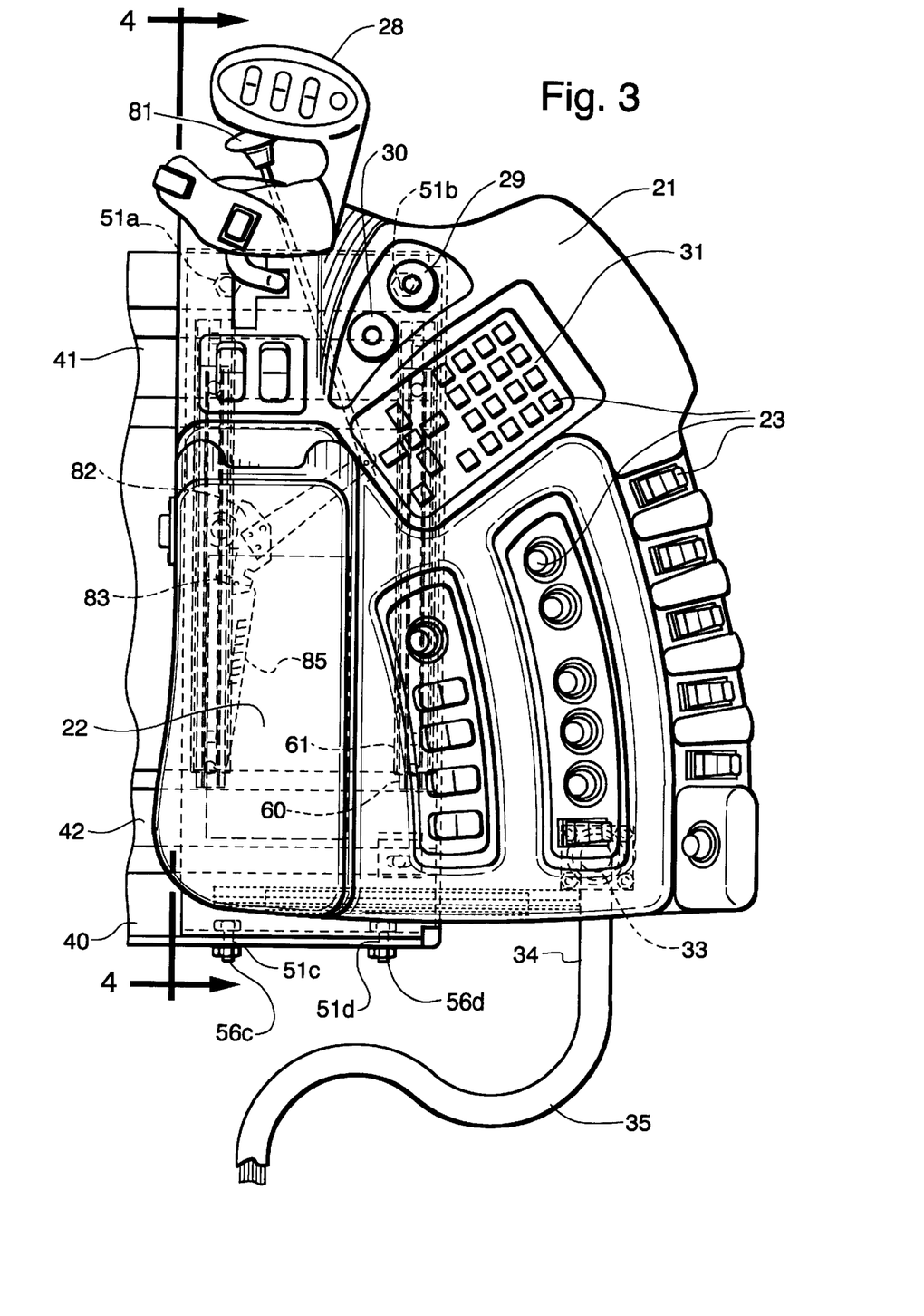
FIG. 3 is an overhead view of the operator's console with phantom lines indicating various aspects and motion of the present invention.
Figure 4:
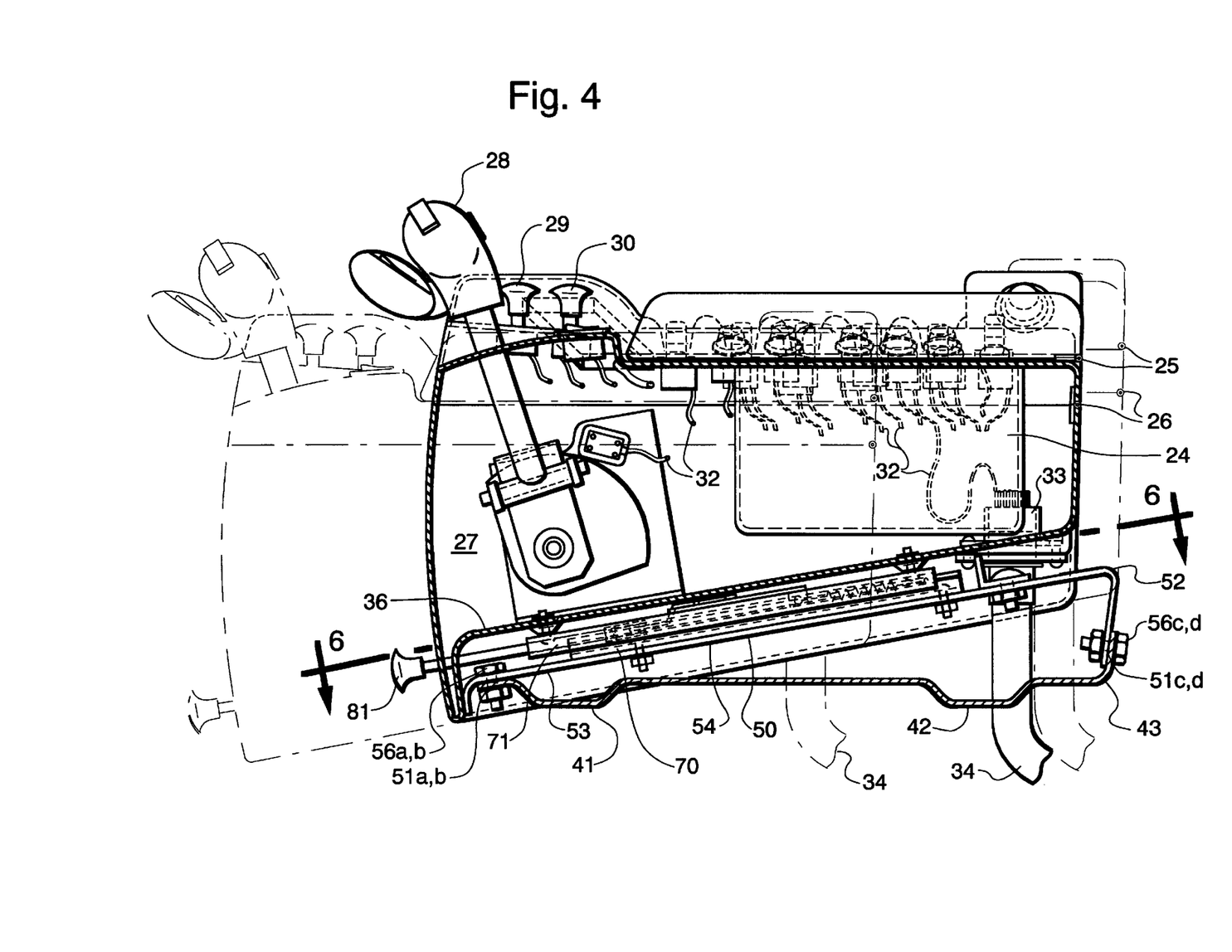
FIG. 4 is a cut-away view taken along line 4—4 of FIG. 3 indicating with phantom lines the sliding motion of the present invention.
Figure 5:
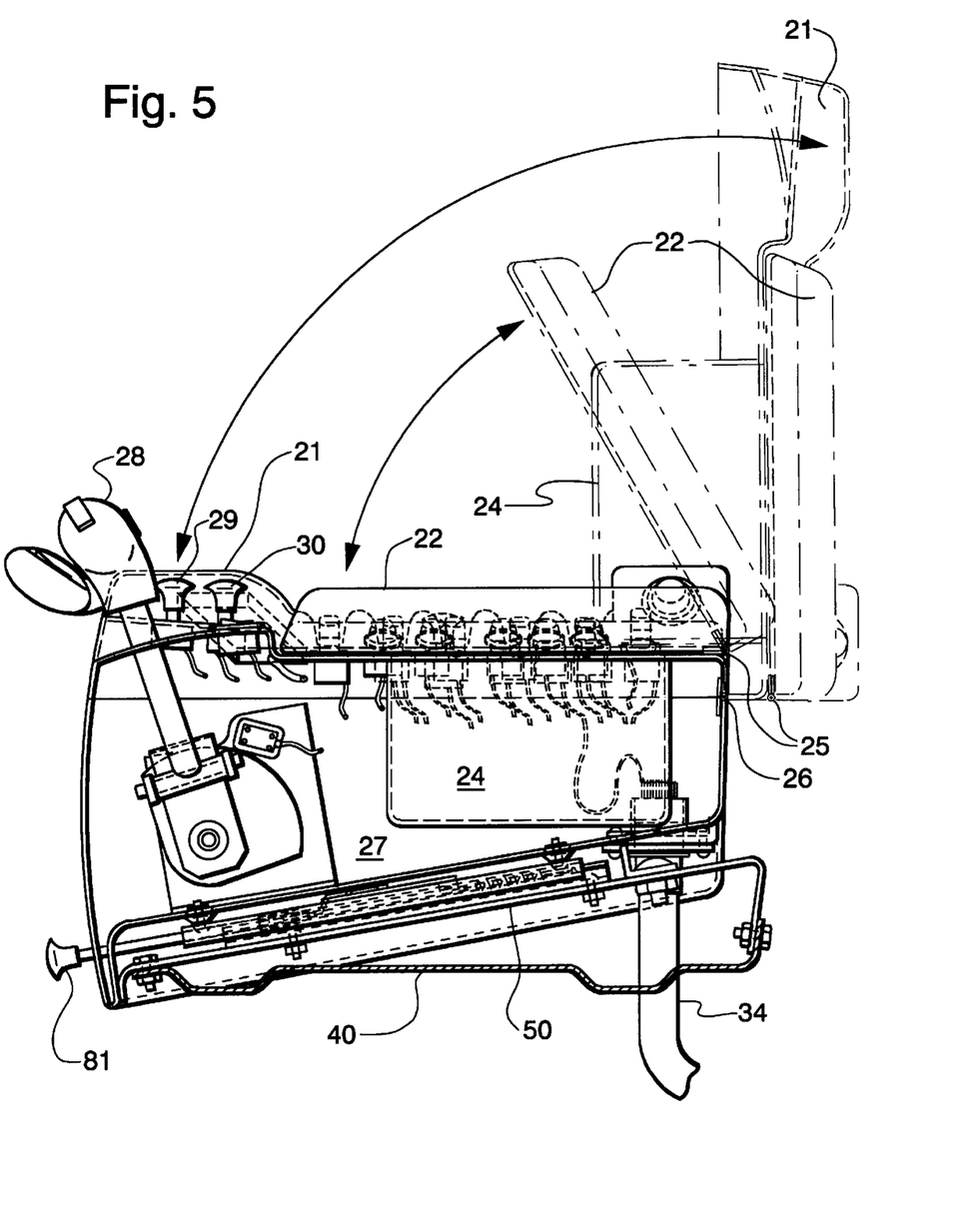
FIG. 5 is a cut-away view indicating with phantom lines the movement of the glove compartment and the console surface being raised.
Figure 6:
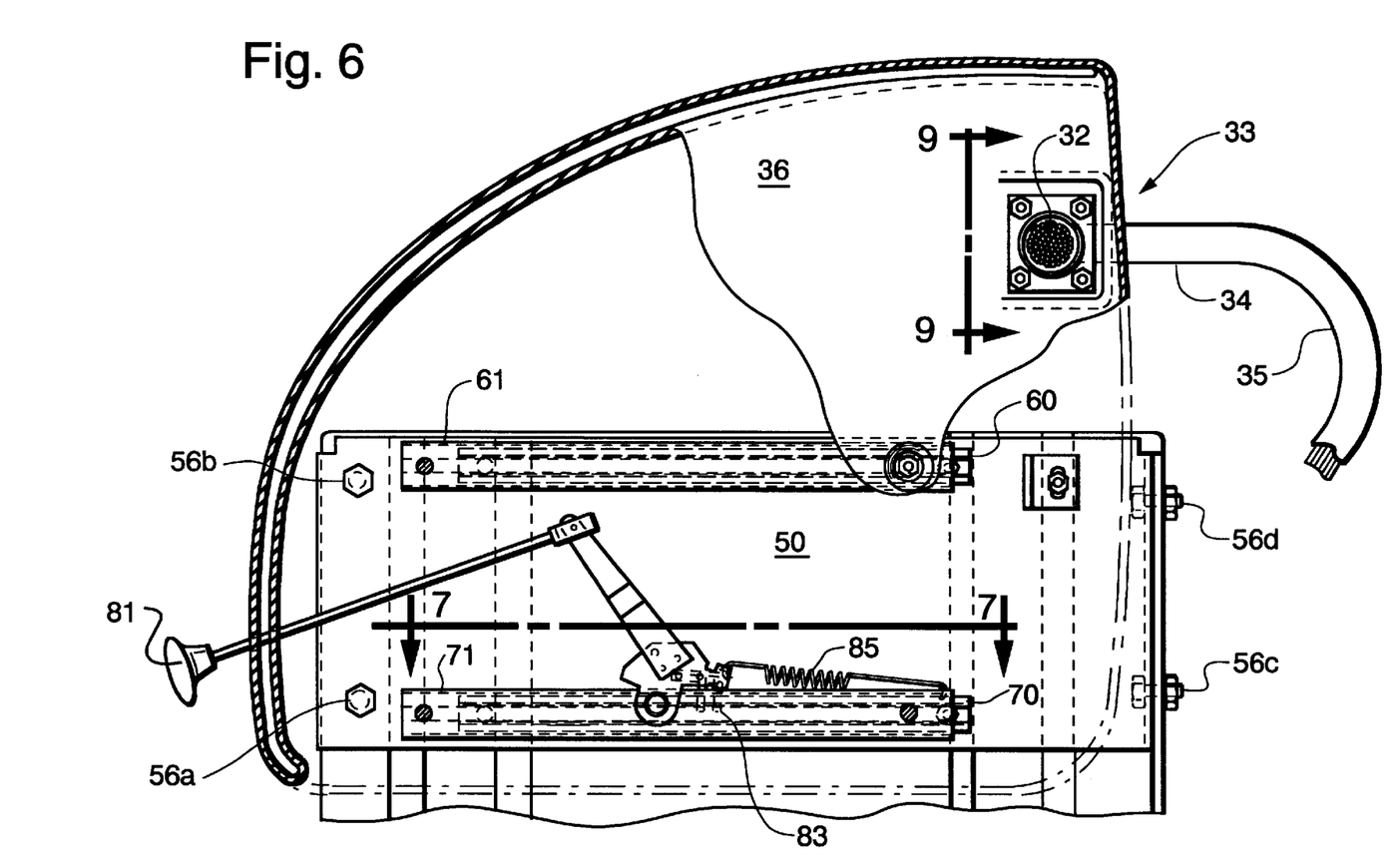
FIG. 6 is a cut-away view taken along line 6—6 of FIG. 4 showing an overhead view of the release mechanism and harness plug.
Figure 7:
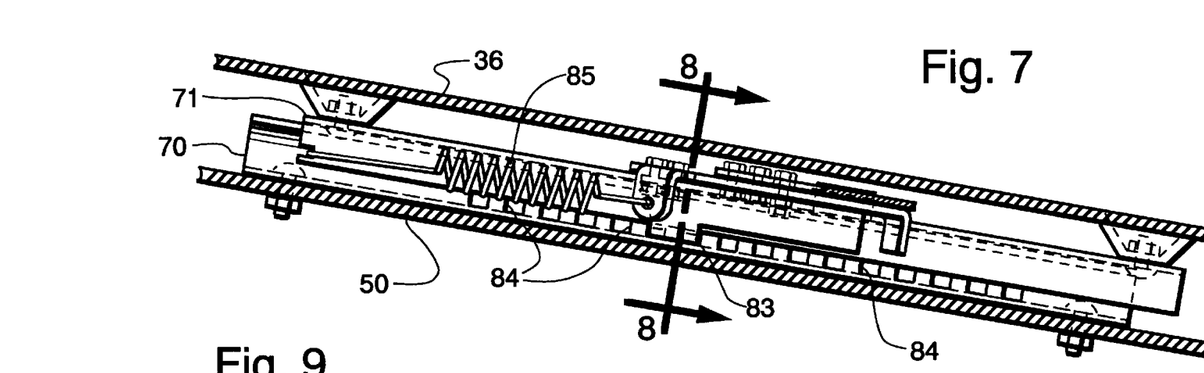
FIG. 7 is a cut-away view taken along line 7—7 of FIG. 6 showing a side view of the console and plate tracks, spring and apertures.
Figure 8:
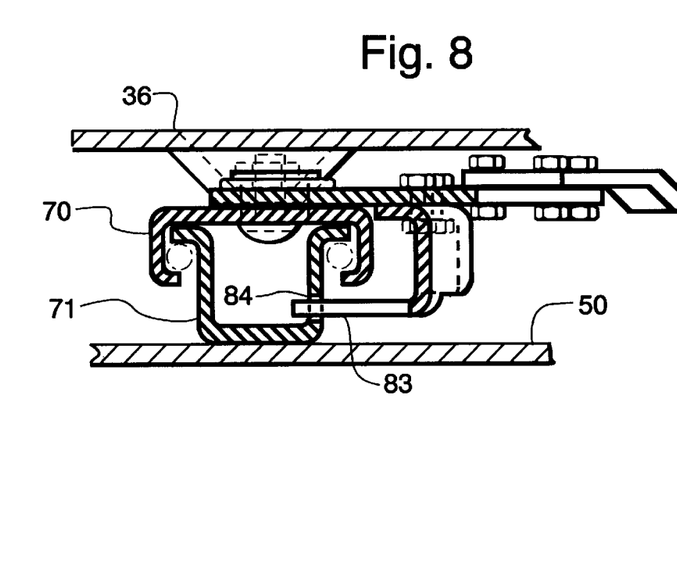
FIG. 8 is a cut-away view taken along line 8—8 of FIG. 7 showing a view of the console and plate tracks and release mechanism.
Figure 9:
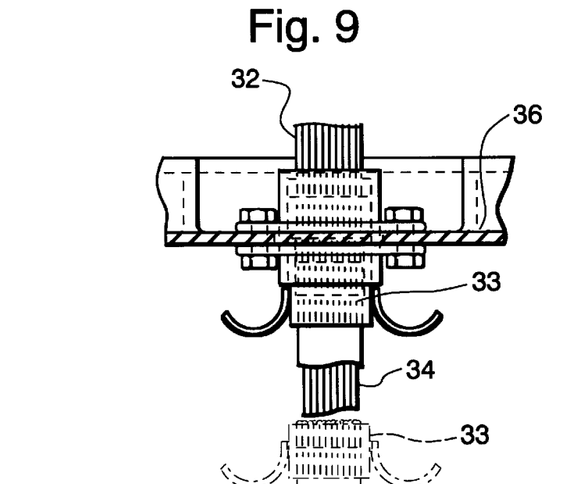
FIG. 9 is a cut-away view taken along line 9—9 of FIG. 6 showing a view of the harness plug. The phantom lines indicate the wire harness being removed from the harness plug.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

The invention is located within the cab of a combine. A typical combine has a header for cutting a crop. As the combine and header are moved forward, the grain and stalk are cut by the header. The header moves the grain into an auger trough. A transverse auger pushes the grain and stalk in the auger trough to the center of the header. Located at the center of the header is the feeder house or elevator. The feeder house moves the grain and stalks rearward into the threshing and separation systems of the combine. After processing and separation, the processed grain is stored in a grain tank located near the top of the combine. The trash or chaff is ejected from the rear of the combine. The operator runs the combine from the cab located behind the header and at the front of the combine. From the cab the operator can observe most the various combine functions. The cab usually has a large glass window or several windows which afford the operator the maximum ability to monitor the header.

Located in the center of the cab is the steering wheel. Behind the steering wheel is an operator's chair. Located in close proximity to the operator's chair is the operator's console.

The present invention 10 is located within the cab 2 of the combine 1 and consists of several elements. A general review of the major elements will be followed by a more detailed description later. On the chair support assembly 5 is a support plate 40. Affixed on the support plate 40 is a seat 7. Also affixed to the support plate 40 is an inclined plate 50. The control console 20 slides along several tracks 60, 61, 70 and 71 mounted between the inclined plate 50 and the console 20. Normally the control console 20 remains in a locked position. The operator allows the console 20 to move by manipulating a release mechanism 80.

The support plate 40 is attached to a conventional chair support assembly 5. This assembly 5 is well known in the art. It can be adjusted to suit a particular operator's requirements. A conventional assembly 5 can move up or down, rearward or forward. The chair support assembly 5 is affixed on the cab floor 3 behind the steering wheel. The support plate 40 is generally rectangularly shaped and has several channels 41 and 42 in the plate 40. The channels 41 and 42 extend from the left side to the right of the support plate 40. The channels 41 and 42 provide rigidity and strengthen the support plate 40. The channels 41 and 42 strengthen the support plate 40 without the additional weight which could have deleterious effects on the operation of the chair support assembly 5. In the illustrated preferred embodiment, there are two channels—the first channel 41 and the second channel 42. To further strengthen the support plate 40 without adding weight, the first bend 43 has been added to the rear edge of the support plate 40. The support plate 40 is further divided into two portions—a console portion 44 and a seat portion 45. The chair 4 with a seat 7 and seat back 8 is mounted to the support plate 40. The seat 7 is attached to the seat portion 45 of the support plate 40. The inclined plate 50 is attached at the console portion 44 of the support plate 40.

The inclined plate 50 has an inclined bend 52 that creates a longitudinal angle 53 between the support plate 40 and the console 20. The inclined plate has four bolt holes 51a, 51b, 51c and 51d by which bolts are used to affix the inclined plate to the support plate. The bolt holes 51 are positioned such that they can be easily reached and the bolts removed. This would allow quick removal of the console for maintenance or repairs to any controls. The inclined plate has an inclined length 54.

The control console or console 20 has several design features. The console 20 has a control surface 21 on which the controls 23 are placed. It also has a right arm rest 22 and a glove (or manual) compartment 24 hinged 25 to the console 20. The controls 23 on the console 20 include the hydraulic control handle 28, a rotor engage button 29, a header engage button 30 and an electronic monitor with a keyboard 31. The hydraulic control handle 28 is located forward of the right arm rest 22. The hydraulic control handle 28 controls the speed of the combine and lateral tilt of the header. A console hinge 26 allows the control surface 21 to be lifted and the interior of the console 27 to be revealed. The interior of the console 27 contains internal wiring 32 which connects the various controls 23 to a wire harness 34. The internal wiring 32 connects to a harness plug 33. The harness plug 33 connects the interior 27 of the console to the base 36 of the console. The wire harness 34 can be attached to the harness plug 33. The harness plug 33 is positioned in the base 36 of the console towards the rear, right-side of the cab and also away from the inclined plate 50 and support plate 40. This location of the plug 33 is important so as to prevent the wire harness 34 from twisting or becoming compressed. Such twisting or compression could interfere with the wiring and detrimentally impact the control of the combine. The plug 33 is also positioned to allow for the wire harness 34 to have a 'bend' 35. This insures that there is a sufficient amount of wire in the wire harness 34 when the console 20 moves. Finally, the console is generally wedge-shaped with the pinnacle of the wedge pointing forward. This maximizes the operator's view and avoids any obstructions.

Connecting the console base 36 to the inclined length 54 of the inclined plate 50 are a series of tracks 60, 61, 70 and 71. These tracks also support the console 20. In the preferred embodiment, there are two sets of tracks parallel to each other and generally oriented to the front and rear. This allows the console to move forward or rearward. The first plate track 60 and second plate track 70 are affixed to the inclined length 54 of the inclined plate 50. At least one of the plate tracks has several apertures 84. The first console track 61 is placed within the first plate track 60. The second console track 71 is inserted within the second plate track 70. Each console track 61 or 71 is affixed to the console base 36. The console track 61 or 71 is able to slide within the plate track 60 or 70. The tracks 60, 61, 70 and 71 in conjunction with the support plate 40 allow a larger, heavier console to be supported by the chair support assembly 5. Previous designs were limited by the use of a pivot pin which could support much less weight and consequently could house fewer controls and adjustment mechanisms.

A release mechanism 80 controls the sliding between the plate tracks 60 and 70 and the console tracks 61 and 71. The release mechanism in the preferred embodiment consists of a triangularly shaped pivot plate 82 which is affixed to a console track 60. Attached to the pivot plate 82 is a handle 81 which projects to the front of the console 20. The pivot plate 82 also has a ratchet which is biased by a spring 85 to be inserted into an aperture 84 located in the plate track 60 or 70. When the operator moves the handle 81, the pivot plate 82 rotates and the ratchet 83 is removed from the aperture 84. This allows the console tracks 61 and 71 to slide within the plate tracks 60 and 70. When the operator releases the handle 81 the pivot plate 82 is biased by the spring 85 and the ratchet 83 is inserted an aperture 84 in the plate track. This safely secures the console 20 during farming operations.

The tracks between the inclined length 54 and the console base 36 vary the distance between the human elbow to the fingertip to accommodate a range of operators. SAE standard J833 specifies that to accommodate a fifth percentile person (very small build) to a ninety-fifth percentile person (very large build) the range should be approximately 6 inches. Therefore the inclined length is this value. The amount of height variation was chosen based on the SAE J833 elbow height to hip pivot distance. This resulted in a 10 degree longitudinal angle 53 in the inclined bend 52. This allows the control console 20 to be adjusted to accommodate wide range of operators based on their own physical attributes. The console 20 may also be adjusted to alleviate fatigue by allowing an operator to easily adjust the console 20 at different times during the work day.

In normal operations, the operator will be seated in the chair 4 with the left arm operating the steering wheel and the right arm operating the hydraulic control handle 28 with their right elbow on the right arm rest 22. The operator can adjust the console 20 by moving the handle 81 which allows the console 20 to move forward or backward and upward or downward on the inclined plate 50. When maintenance or repairs are necessitated, the interior 27 of the console can be gained by opening the control surface 21. The entire console can be removed by unplugging the wire harness 34 from the wire plug 33. The four bolts 56a, 56b, 56c and 56d are then removed from the inclined plate 50 permitting the console to be detached.

It will be obvious to those skilled in the art that various changes may be made without departing from the scope of the invention and the invention is not to be considered limited to what is illustrated in the drawings and described in the specification.

What is claimed is:

1. An operator seat sliding control console, comprising:
   a. a chair support assembly affixed to a cab floor;
   b. a support plate having a seat region and a console region, said seat region affixed to the chair support assembly, said support plate having a plurality of channels for strengthening said plate;
   c. a seat affixed to the seat region, said seat having a seat back and a left arm rest;
   d. an inclined plate affixed to the console region;
   e. an console slideably attached to the inclined plate by a plurality of tracks; and f. a release mechanism for operating the each track, said release mechanism pivotally affixed to the track, whereby the console may be moved relative to the seat.

2. The operator seat sliding control console described in claim 1, wherein there is first channel and second channel for strengthening the support plate.

3. The operator seat sliding control console described in claim 2, wherein the seat portion further comprises a first bend for strengthening the support plate.

4. The operator seat sliding control console described in claim 3, wherein the inclined plate is affixed to the seat portion by four bolts.

5. The operator seat sliding control console described in claim 4, wherein the inclined plate has an angle of 10 degrees and an incline length of 6 inches.

6. The operator seat sliding control console described in claim 5 wherein the console is wedge-shaped so as maximize an operator's view from the cab.

7. The operator seat sliding control console described in claim 6 wherein the console further comprises an interior, a base and a control surface.

8. The operator seat sliding control console described in claim 7 wherein the control surface further comprises a hydraulic control handle, a rotor engage button, a header engage button, an electronic monitor and a glove compartment, said glove compartment having a glove compartment hinge.

9. The operator seat sliding control console described in claim 8 wherein the hydraulic control handle, the rotor engage button, the header engage button, and the electronic monitor are electrically connected to a harness plug by a plurality of internal wires, said harness plug connecting the interior to the base, whereby the harness plug does not contact the inclined plate.

10. The operator seat sliding control console described in claim 9, wherein the console further comprises a console hinge, whereby access can be gained to the interior.

11. The operator seat sliding control console described in claim 10 wherein each track further comprises a plate track and a console track, said plate track affixed to the inclined plate and said console track affixed to the base, said plate track slideably connected to the console track, said plate track having a plurality of apertures, therein.

12. The operator seat sliding control console described in claim 11 wherein the release mechanism further comprises a pivot plate pivotally attached to the console track, said pivot plate having a handle, a ratchet and a spring, whereby the handle moves the ratchet into an aperture.

13. In a cab of a combine harvester, said cab having a chair with a seat and seat back, said chair affixed to a cab floor by a chair support assembly, a left arm rest affixed to the seat, a control console having a plurality of controls said controls further comprising an hydraulic control handle, a rotor engagement button, a header engagement button, an electronic monitor, said plurality of controls electronically connected to a harness plug, said harness plug affixed to the control console, the improvement comprising:

a. a support plate with a plurality of channels, the support plate also having a seat portion and a console portion, the seat affixed to the seat portion, an inclined plate affixed to the console portion;

b. said console slideably affixed to the inclined plate by a plurality of tracks; and    c. a release mechanism pivotally affixed to the track, whereby the release mechanism allows the console to slide relative to the inclined plate.

14. The improvement described in claim 13, wherein the inclined plate further comprises:

a. a longitudinal angle of 10 degrees; and b. An incline length of 6 inches.

15. The improvement described in claim 14, wherein the inclined plate further comprises:

a. The harness plug does not contact the inclined plate b. four bolt holes, whereby which the inclined plate is affixed to the support plate.

16. The improvement described in claim 15 wherein each track further comprises a plate track and a console track, said plate track affixed to the inclined plate and said console track affixed to the base, said plate track slideably connected to the console track, said plate track having a plurality of apertures, therein.

17. The improvement described in claim 16 wherein the release mechanism further comprises a pivot plate pivotally attached to the console track, said pivot plate having a handle, a ratchet and a spring, whereby the handle moves the ratchet into an aperture.

\* \* \* \* \*